United States Patent
Hayakawa et al.

(10) Patent No.: US 11,936,067 B2
(45) Date of Patent: Mar. 19, 2024

(54) ALKALINE BATTERY SEPARATOR AND METHOD FOR PRODUCING SAME

(71) Applicant: KURARAY CO., LTD., Kurashiki (JP)

(72) Inventors: Tomohiro Hayakawa, Okayama (JP); Haruna Mitsumori, Okayama (JP); Toshimichi Kusunoki, Okayama (JP); Hiroyuki Kawai, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 348 days.

(21) Appl. No.: 17/418,542

(22) PCT Filed: Dec. 13, 2019

(86) PCT No.: PCT/JP2019/048969
§ 371 (c)(1),
(2) Date: Jun. 25, 2021

(87) PCT Pub. No.: WO2020/137630
PCT Pub. Date: Jul. 2, 2020

(65) Prior Publication Data
US 2022/0069417 A1    Mar. 3, 2022

(30) Foreign Application Priority Data

Dec. 26, 2018  (JP) .................................. 2018-243374

(51) Int. Cl.
| H01M 50/446 | (2021.01) |
| H01M 50/406 | (2021.01) |
| H01M 50/409 | (2021.01) |
| H01M 50/414 | (2021.01) |
| H01M 50/44  | (2021.01) |
| H01M 50/489 | (2021.01) |
| H01M 50/494 | (2021.01) |

(52) U.S. Cl.
CPC ....... *H01M 50/446* (2021.01); *H01M 50/406* (2021.01); *H01M 50/409* (2021.01); *H01M 50/414* (2021.01); *H01M 50/44* (2021.01); *H01M 50/489* (2021.01); *H01M 50/494* (2021.01)

(58) Field of Classification Search
None
See application file for complete search history.

(56) References Cited

U.S. PATENT DOCUMENTS

| 2006/0281008 A1* | 12/2006 | Mitani | ................. | H01M 50/44 429/247 |
| 2009/0017385 A1 | 1/2009 | Harada et al. | | |
| 2011/0300430 A1* | 12/2011 | Usami | ................. | H01M 50/417 429/188 |
| 2013/0059192 A1* | 3/2013 | Kajita | ................. | H01M 50/457 429/143 |
| 2013/0149614 A1 | 6/2013 | Kubo et al. | | |
| 2013/0260200 A1 | 10/2013 | Yun et al. | | |
| 2016/0365601 A1* | 12/2016 | Albertus | ........... | H01M 10/0525 |
| 2018/0269450 A1 | 9/2018 | Hayakawa et al. | | |

FOREIGN PATENT DOCUMENTS

| CN | 102326277 A | 1/2012 |
| JP | 6-231746 A | 8/1994 |
| JP | 9-245762 A | 9/1997 |
| JP | 10-92411 A | 4/1998 |
| JP | 10-312785 A | 11/1998 |
| JP | 2013-223957 A | 10/2013 |
| JP | 2014-26877 A | 2/2014 |
| KR | 10-2016-0110162 A | 9/2016 |
| WO | WO 2006/090790 A1 | 8/2006 |
| WO | WO 2017/047638 A1 | 3/2017 |

OTHER PUBLICATIONS

International Search Report dated Mar. 17, 2020 in PCT/JP2019/048969 (submitting English translation only), citing documents AO through AU therein, 2 pages.
International Preliminary Report on Patentability and Written Opinion dated Jun. 16, 2021 in PCT/JP2019/048969 (submitting English translation only), citing documents AO through AU therein, 5 pages.
Extended European Search Report dated Jan. 27, 2022 in European Patent Application No. 19902131.2, citing documents AA, AB, AO and AP therein, 8 pages
Combined Chinese Office Action and Search Report dated Sep. 30, 2022 in Chinese Patent Application No. 201980085587.1, citing document 15 therein, 7 pages.

* cited by examiner

*Primary Examiner* — Anca Eoff
(74) *Attorney, Agent, or Firm* — Oblon, McClelland, Maier & Neustadt, L.L.P.

(57) ABSTRACT

An alkaline battery separator containing an alkali resistant fiber and a binder, wherein the alkaline battery separator has two surfaces which are a surface A that is smoother comparing with the other surface and has an arithmetic mean surface roughness Ra (A), and a surface B that is rougher and has an arithmetic mean surface roughness Ra (B), the amount of the binder is 5 to 20% by mass based on the total mass of the separator, a value obtained by dividing the arithmetic mean surface roughness Ra (A) by the arithmetic mean surface roughness Ra (B) [Ra (A)/Ra (B)] is 0.700 or more and 0.980 or less, and the arithmetic mean surface roughness Ra (B) of the surface B is 3.0 μm or more and 10 μm or less.

8 Claims, 1 Drawing Sheet

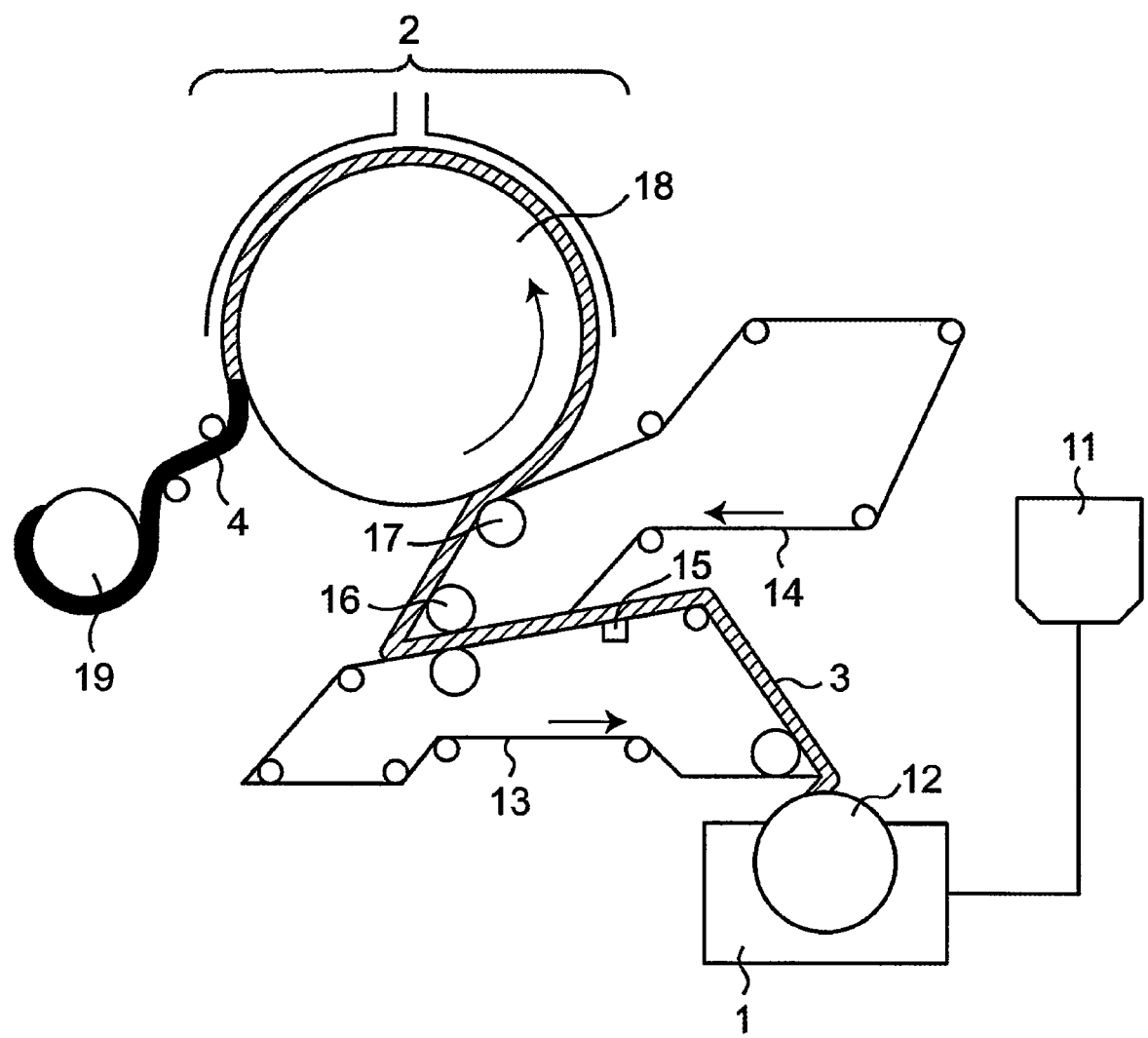

ALKALINE BATTERY SEPARATOR AND METHOD FOR PRODUCING SAME

TECHNICAL FIELD

The present invention relates to an alkaline battery separator suitable for an alkaline battery in which alkaline electrolyte solution is used, a method for producing the same, and an alkaline battery comprising the separator.

BACKGROUND ART

Generally, in an alkaline battery, an anion having a negative charge is moved from a positive electrode thereof toward a negative electrode thereof and a cation having a positive charge is moved from the negative electrode toward the positive electrode, through an alkaline electrolyte solution thereof, and a separator is used between the positive and negative electrodes for separating these two electrodes from each other and for isolating a positive electrode active material and a negative electrode active material from each other. Conventionally, an alkaline battery separator has been required to prevent an internal short-circuit and simultaneously satisfy various requirements such as a high alkali resistance, shielding properties, and excellent electric properties. Various alkaline battery separators have been proposed in which alkali resistant synthetic fibers or alkali resistant cellulose fibers are used to imparted such performances to the separators (Patent Documents 1 and 2).

PRIOR ART DOCUMENTS

Patent Documents

Patent Document 1: JP-A-H06-231746
Patent Document 2: JP-A-2014-26877

SUMMARY OF THE INVENTION

Problems to be Solved by the Invention

In general, an alkaline battery separator is incorporated in a battery in a state of being wound in a cylindrical shape or a spiral shape. Such an alkaline battery separator is usually wound around a metal mandrel or the like, and is inserted into a battery; then, the mandrel is pulled out, so that the separator is fixed inside the battery. In such a battery production process, when the mandrel around which the separator is wound is inserted into the battery or when the mandrel is pulled out of the battery, the edge of the wound separator is misaligned in a so-called bamboo shoot shape in some cases. If such a winding misalignment of the edge occurs when the separator is incorporated into the battery, the product becomes defective at that point and is subject to disposal. Therefore, the occurrence of the winding misalignment causes a decrease in battery productivity. Most of the conventional alkaline battery separators as disclosed in the above patent documents have been developed by paying attention to the separator function after the incorporation of the separator into the battery, and the process passability when the separator is incorporated into a battery or the productivity of the separator have not been always fully satisfactory.

It is an object of the present invention to provide an alkaline battery separator that has excellent process passability and is suitable for producing an alkaline battery with high productivity. The object can be achieved by suppressing the occurrence of a winding misalignment upon the incorporation of the alkaline battery separator into a battery while ensuring a sufficient mechanical strength of the alkaline battery separator.

Means for Solving Problems

The present inventors intensively studied to solve the above-described problems, thereby completing the present invention. That is, the present invention includes the following preferred aspects.

[1] An alkaline battery separator comprising at least one alkali resistant fiber and a binder,
wherein the alkaline battery separator has two surfaces which are a surface A that is smoother comparing with the other surface and has an arithmetic mean surface roughness Ra (A), and a surface B that is rougher and has an arithmetic mean surface roughness Ra (B),
the amount of the binder is 5 to 20% by mass based on the total mass of the separator,
a value obtained by dividing the arithmetic mean surface roughness Ra (A) by the arithmetic mean surface roughness Ra (B) [Ra (A)/Ra (B)] is 0.700 or more and 0.980 or less, and
the arithmetic mean surface roughness Ra (B) of the surface B is 3.0 μm or more and 10 μm or less.

[2] The alkaline battery separator according to [1], wherein the binder is a polyvinyl alcohol-based binder.

[3] The alkaline battery separator according to [1] or [2], wherein at least a part of the alkali resistant fiber is a polyvinyl alcohol-based fiber.

[4] The alkaline battery separator according to any one of [1] to [3], wherein at least a part of the alkali resistant fiber is a cellulose fiber.

[5] The alkaline battery separator according to any one of [1] to [4], having an air permeability of 50 cc/cm$^2$/sec or less.

[6] The alkaline battery separator according to any one of [1] to [5], having a tensile strength in a vertical direction of 2 kg/15 mm or more.

[7] A method of producing the alkaline battery separator according to any one of [1] to [6], the method comprising:
a papermaking step of obtaining wet paper by a wet papermaking method; and
a drying step of drying the wet paper using a contact dryer,
wherein the drying step comprises applying a pressure, in a thickness direction, to the wet paper having a water content of 65 to 75% by mass.

[8] An alkaline battery comprising the alkaline battery separator according to any one of [1] to [6].

Effects of the Invention

According to the present invention, an alkaline battery separator that has excellent process passability and is suitable for manufacture of an alkaline battery with high productivity can be provided by suppressing the occurrence of a winding misalignment upon the incorporation of the alkaline battery separator into a battery while ensuring a sufficient mechanical strength of the alkaline battery separator.

BRIEF DESCRIPTION OF THE DRAWINGS

The FIGURE is a schematic view for explaining an embodiment of a method of the present invention for producing an alkaline battery separator.

MODE FOR CARRYING OUT THE INVENTION

Hereinafter, embodiments of the present invention will be described in detail, however, the present invention is not limited thereto.

An alkaline battery separator of the present invention is a sheet-like separator having two surfaces, the separator comprising at least one alkali resistant fiber and a binder. In the alkaline battery separator of the present invention, one surface and the other surface of the two surfaces have different surface topographies (surface roughnesses). By controlling topographies of the two surfaces of the separator, it becomes easier to control a frictional force that is generated between one surface and the other surface of the separator that are adjacent to each other when the separator is wound around a mandrel such as a metal rod so as to be incorporated into a battery, as well as to control a frictional force generated between the separator and the mandrel; thereby, a separator to which a winding misalignment is less likely to occur in the manufacturing of a battery can be obtained.

In the separator of the present invention, the surface roughnesses of the two surfaces are compared, and the smoother surface is referred to as A (hereinafter, also referred to as "surface A"), and the rougher surface is referred to as B (hereinafter, also referred to as "surface B"). Then, a value [Ra (A)/Ra (B)] obtained by dividing an arithmetic mean surface roughness Ra (A) of the surface A by an arithmetic mean surface roughness Ra (B) of the surface B is 0.700 or more and 0.980 or less. If the value of Ra (A)/Ra (B) is less than 0.700, the difference between the surface roughnesses of the surfaces A and B that are adjacent to each other when the separator is wound becomes excessively large, and a frictional force between the two surfaces tends to be small, as a result of which a winding misalignment is likely to occur. When the value of Ra (A)/Ra (B) exceeds 0.980, the difference between the surface roughnesses of the surfaces A and B that are adjacent to each other when the separator is wound becomes small, and it is conceivable that the surfaces A and B are almost equally smooth, or the surfaces A and B are almost equally rough. In the former case, the frictional force generated between the surface A and the surface B tends to be small, which makes it likely that a winding misalignment would occur. In the latter case, although a winding misalignment can be suppressed, filaments of the alkali resistant fiber constituting the separator are not sufficiently bound to one another by the binder, resulting in that the separator tends to be inferior in mechanical strength, or the separator has a lower denseness, thereby having poor shielding properties. When the value of Ra (A)/Ra (B) indicating the difference in surface roughness between the surfaces A and B is in the above-described range, it is possible to obtain a separator that has an excellent effect of suppressing a winding misalignment when the separator is incorporated into a battery, while surely having shielding properties required of the alkaline battery separator and having high mechanical properties such as a tensile strength sufficient for withstanding tension applied to the separator in the production process. In the present invention, the value of Ra (A)/Ra (B) is preferably 0.720 or more, more preferably 0.750 or more, and preferably 0.970 or less, more preferably 0.950 or less.

In the separator of the present invention, the arithmetic mean surface roughness Ra (B) of the surface B is 3.0 μm or more and 10 μm or less. If the Ra (B) of the surface B, which is the rougher surface of the two surfaces of the separator, is less than 3.0 μm, both surfaces of the separator are smooth surfaces, having a smaller frictional force generated between the surface A and the surface B during winding, which makes a winding misalignment likely to occur. At the same time, the frictional force generated between the surface A or the surface B and the mandrel is larger, which makes a winding misalignment likely to occur when the separator is incorporated in a battery. Further, when Ra (B) exceeds 10 μm, the denseness of the separator tends to decrease, thereby causing the separator to have poor shielding properties. In the present invention, the value of Ra (B) can be appropriately determined depending on the relationship thereof with the arithmetic mean surface roughness Ra (A) of the surface A of the target separator; however, Ra (B) is preferably 3.5 μm or more, more preferably 5.0 μm or more, further preferably 6.0 μm or more, particularly preferably 7.0 μm or more, more particularly preferably 7.8 μm or more, and preferably 9.5 μm or less, more preferably 9.0 μm or less.

In the separator of the present invention, the arithmetic mean surface roughness Ra (A) of the surface A can be appropriately determined depending on the relationship thereof with the arithmetic mean surface roughness Ra (B) of the surface B of the target separator; however, it is preferably 2.5 μm or more and 9.1 μm or less. When Ra (A) of the surface A is within the above-described range, an appropriate frictional force acts between the surface A and the surface B when the separator is wound, and effectively suppresses the occurrence of a winding misalignment when the separator is incorporated into the battery. In the present invention, Ra (A) is more preferably 3.6 μM or more, further preferably 5.6 μm or more, and more preferably 9.8 μm or less, further preferably 8.6 μm or less.

The arithmetic mean surface roughness of the separator surface can be measured in accordance with JIS B0601 using a surface roughness meter. Specifically, the arithmetic mean surface roughness can be measured by the method described in Examples described below.

The surface roughnesses of the two surfaces of the separator can be controlled by adjusting the types of alkali resistant fiber and the binder used for the separator, the combination of the same, the contents of these, and the drying conditions during the papermaking in the separator production process, and the like.

The separator of the present invention comprises at least one alkali resistant fiber. In the present invention, "alkali resistant fiber" means a fiber that exhibits chemical durability against alkali. In general, examples of the alkali resistant fiber include alkali resistant synthetic fibers, alkali resistant organic fibers such as alkali resistant cellulose fibers, and alkali resistant inorganic fibers such as alkali resistant glass fibers. The alkali resistant synthetic fiber has a very high alkali resistance, since the elution amount thereof in an alkaline electrolyte solution is small compared to those of other types of fibers such as glass fibers. Therefore, it is preferable that the alkaline battery separator of the present invention comprises the alkali-resistant synthetic fibers as the alkali-resistant fibers which constitute the alkaline battery separator of the present invention.

Examples of the alkali resistant synthetic fiber that may constitute the alkaline battery separator of the present invention include polyvinyl alcohol-based fiber, ethylene-vinyl alcohol-based copolymer fiber, polypropylene fiber, polyethylene fiber, polyamide fiber, polypropylene-polyethylene composite fiber, and polyamide-modified polyamide composite fibers. These can be used alone or in combination of two or more. Among these, it is preferable that at least a part of the alkali resistant fiber constituting the alkaline battery separator of the present invention is a polyvinyl alcohol-based fiber, since it is excellent in affinity (wettability) with the electrolyte solution.

In particular, in the present invention, it is preferable to use a polyvinyl alcohol-based fiber having an in-water dissolution temperature of 90° C. or higher (for example, about 90 to 200° C.), or particularly, 100° C. or higher (for example, about 100 to 150° C.) as the alkali resistant fiber. More specifically, a fiber made of a vinyl alcohol-based polymer having an average polymerization degree of 1,000 to 5,000 and a saponification degree of 95 mol % or more is preferably used. The vinyl alcohol-based polymer may be copolymerized with another copolymer component. In this case, the copolymerization amount is preferably 20 mol % or less, and particularly preferably 10 mol % or less, from the viewpoint of water resistance and the like. Further, a treatment such as acetalization may be performed as required.

When a polyvinyl alcohol-based fiber is used in the present invention, the polyvinyl alcohol-based fiber does not need to comprise only the vinyl alcohol-based polymer, and may comprise other polymers. The fiber may be a composite spun fiber, a mixed spun fiber (sea-island fiber), or the like, with another polymer. From the viewpoints of the absorbent property for electrolyte solutions and the mechanical performance, it is preferable to use a polyvinyl alcohol-based fiber comprising a vinyl alcohol-based polymer of preferably 30% by mass or more, more preferably 50% by mass or more, and further preferably 80% by mass, based on the total mass of the polyvinyl alcohol-based fiber.

In a preferred embodiment of the present invention, the alkaline battery separator of the present invention comprises a polyvinyl alcohol-based fiber as at least a part of the alkali resistant fiber. Polyvinyl alcohol-based fibers have high resistance to alkaline electrolyte solutions and are also excellent in the absorbent property for electrolyte solutions. Therefore, by using a polyvinyl alcohol-based fiber as an alkali resistant fiber, the separator has improved alkali resistance and absorbent property for electrolyte solutions. Further, use of a polyvinyl alcohol-based fiber improves the stiffness, thereby making it possible to suppress the deformation of the separator arranged in the battery.

In the present invention, the fineness of the alkali resistant fiber is preferably 0.1 dtex or more, more preferably 0.2 dtex or more, and preferably 1.0 dtex or less, more preferably 0.8 dtex or less, further preferably 0.6 dtex or less. When the fineness of the alkali resistant fiber is within the above-described range, the separator has excellent shielding properties, and in the manufacture of the separator, a proper thickness can be secured in a stage before an adjustment to obtain a set thickness after the papermaking. The alkali resistant fiber preferably has an average fiber length of about 1 to 6 mm. In the present invention, a plurality of fibers having different finenesses and/or fiber lengths may be used in combination, whereby the thickness of the paper obtained by the papermaking can be controlled to a desired thickness, and a necessary thickness for a separator can be ensured.

The fineness and the average fiber length can be measured and calculated in accordance with JIS L1015.

In the present invention, it is preferable that at least a part of the alkali resistant fiber constituting the alkaline battery separator is a cellulose fiber. Particularly, in a case where the alkaline battery separator comprises a beaten cellulose fiber, ultrafine filaments of the beaten cellulose fibers, which are obtained by beating, are entangled with a support body formed with an alkali resistant fiber and a binder, whereby a separator having excellent shielding properties can be obtained.

Examples of the cellulosic fiber that the alkaline battery separator of the present invention may comprises include fibrillated substance of organic solvent-spun cellulose fibers, mercerized pulps (natural wood fiber, cotton linter pulp, hemp pulp, and the like), and regenerated cellulose fibers. These alkali resistant cellulosic fibers may be used alone or in combination of two or more.

In the present invention, the "organic solvent-spun cellulose fibers" in the present invention refers to fibers that are different from regenerated cellulose fibers described later and that are formed by precipitating cellulose directly from a solution obtained by dissolving cellulose in an organic solvent without chemically changing the cellulose. In particular, examples thereof include, for example, organic solvent-spun cellulose fibers produced by a method according to which an undiluted spinning solution formed by dissolving cellulose in an amine oxide is dry-wet spun in water to precipitate cellulose and the obtained fibers are further stretched. Typical examples of these fibers include lyocell, and this is sold under a trade name of "Tencel" (a registered trademark) from Lenzing AG in Austria.

When the alkaline battery separator of the present invention comprises a fibrillated organic solvent-spun cellulose fiber as a cellulosic fiber, the fibrillated organic solvent-spun cellulose fiber has, as a value indicative of freeness, a Canadian Standard Freeness (CSF) value that is preferably 5 ml or more, more preferably 10 ml or more, further preferably 200 ml or more, and preferably 600 ml or less, more preferably 550 ml or less, further preferably 500 ml or less. When the freeness of the fibrillated organic solvent-spun cellulose fiber is within the above-described range, a separator having excellent shielding properties can be obtained.

The freeness is a value measured by the measuring method specified in JIS P8121 "Freeness Testing Method for Pulp".

Examples of mercerized pulp that may be used in the present invention include mercerized pulps obtained by mercerizing broad-leaf tree pulp, needle-leaf tree pulp, *eucalyptus* pulp, esparto pulp, cotton linter pulp, pineapple pulp, Manila hemp pulp, and sisal hemp pulp. Among them, a mercerized natural wood fiber is preferable as the mercerized pulp, since it is a material that allows for a more excellent swelling suppressing effect and can be obtained at a relatively low cost.

When the alkaline battery separator of the present invention comprises a mercerized pulp as a cellulose fiber, the mercerized pulp has, as a value indicative of freeness, a CSF value that is preferably 150 ml or more, more preferably 200 ml or more, further preferably 220 ml or more, and preferably less than 500 ml, more preferably less than 450 ml, further preferably less than 400 ml. When the freeness of the beaten cellulose fiber of the mercerized pulp is within the above-described range, a separator having a high swelling suppressing effect and excellent papermaking properties can be obtained.

The freeness is a value measured by the measuring method specified in JIS P8121 "Freeness Testing Method for Pulp".

A beaten cellulose fiber can be obtained by dispersing unbeaten organic solvent-spun cellulose fibers or a mercerized pulp in water and beating the same to a desired freeness with a paper beating machine such as a beater, a disk refiner, or a high-speed beating machine. Above all, in the beating process by the refiner, filaments to be beaten can be caught better due to the mechanical structure as compared with the case of beating using a beater or a high-speed disintegrator, whereby the filaments can be beaten to the target freeness (the degree of beating) efficiently in a short time. Further, since it is unlikely that filaments would become too fine or that some filaments would remain thick, the beating process by the refiner is also advantageous in that the entire filaments can be made fine uniformly.

In the present invention, the "regenerated cellulose fiber" means a fiber obtained by chemically converting cellulose into a cellulose derivative and thereafter converting the cellulose derivative again back to cellulose (hereinafter, this fiber is referred to as "regenerated cellulose fiber"). Examples of the regenerated cellulose fiber include viscose rayon, polynosic rayon, high tenacity viscose rayon, and cuprammonium rayon. These can be used alone or in combination of two or more. When the separator comprises a regenerated cellulose fiber as an alkali resistant fiber, this makes it easier to increase the thickness of the paper after the papermaking, thereby making it easier to control the thickness of the separator so as to achieve a certain set thickness that the separator should have finally in the separator production process.

The content of the alkali resistant fiber in the alkaline battery separator of the present invention is preferably 65% by mass or more, more preferably 70% by mass or more, further preferably 75% by mass or more, and preferably 95% by mass or less, more preferably 90% by mass or less, based on the total mass of the separator. When the content of the alkali resistant fiber is within the above-described range, this makes it easier to obtain a sufficient impact resistance of the separator, and this also makes it easier to reduce possibility that the separator itself would buckle due to an impact caused by vibration or fall of the battery when the battery is conveyed or carried, resulting in an internal short-circuit.

Fibers constituting the alkaline battery separator of the present invention can be appropriately selected from the fibers exemplified above for use in combination according to the desired physical properties and the like, and preferably comprise an alkali resistant synthetic fiber and a cellulose fiber as the alkali resistant fibers. When the main fiber constituting the separator comprises an alkali resistant synthetic fiber, more preferably a polyvinyl alcohol-based fiber, as well as a cellulose fiber, more preferably a beaten cellulose fiber, it is possible to obtain a separator having excellent shielding properties. When the alkaline battery separator of the present invention comprises an alkali resistant synthetic fiber and a cellulose fiber, the mass ratio of the alkali resistant synthetic fiber to the cellulose fiber (alkali resistant synthetic fiber:cellulose fiber) is preferably 20:80 to 80:20, more preferably 30:70 to 70:30, and further preferably 40:60 to 60:40. When the mass ratio of the alkali resistant synthetic fiber and the cellulose fiber is within the above-described range, it is easier to obtain a separator having excellent performances as a separator such as shielding properties and liquid holding properties for holding electrolyte solution, having a high swelling suppressing effect, and also having excellent papermaking properties.

The alkaline battery separator of the present invention comprises a binder. The binder used in the present invention is not particularly limited as long as it can bond filaments of an alkali resistant fiber that is the main fibers constituting the separator. Examples thereof include polyvinyl alcohol-based binders and ethylene-vinyl alcohol-based binders. Among these, a polyvinyl alcohol-based binder is preferable from the viewpoint of electrolyte solution resistance, liquid absorbent property, and the like. The form of the binder may be fibrous, powdery, or solution-like, and any of them can be used. However, when the separator is made by wet papermaking, a fibrous binder is preferable. When the binder is in the form of powder or solution, it is necessary to dissolve the binder to develop the sheet strength of the separator. In this case, the polyvinyl alcohol forms a coating film and closes the voids among the fibers of the separator, and this may cause degradation of the absorbent property for electrolyte solutions and an increase of the internal resistance of the battery. In contrast, when a fibrous binder is used, the binder fibers and the alkali-resistant fibers which constitute the separator can be spot-bonded to each other at their intersections without completely dissolving the binder to leave the fibrous form thereof as it is using a means of reducing the water brought in before drying, or the like. This is particularly preferable because the strength of the separator can be increased without reducing the electrolyte absorption and increasing the internal resistance of the battery.

The in-water dissolution temperature of the polyvinyl alcohol-based binder fiber suitable for this is preferably 60 to 90° C., and more preferably 70 to 90° C. Further, a fiber formed with a polyvinyl alcohol-based polymer having an average polymerization degree of about 500 to 3000 and a saponification degree of 97 to 99 mol % is preferably used. The fiber may be a composite spun fiber, a mixed spun fiber (sea-island fiber), or the like, with another polymer. From the viewpoint of absorbent property for electrolyte solutions, mechanical performances, or the like, it is preferable to use a polyvinyl alcohol-based fiber containing a vinyl alcohol-based polymer of 30% by mass or more, preferably 50% by mass or more, and more preferably 80% by mass or more. The fineness is preferably about 0.01 to 3 dtex, and the fiber length is preferably about 1 to 5 mm, from the viewpoints of water dispersibility, adhesion to other components, pore size, and the like.

The content of the binder in the alkaline battery separator of the present invention is 5 to 20% by mass based on the total mass of the separator. If the content of the binder is less than 5% by mass based on the total mass of the separator, it is difficult to bind filaments of the alkali resistant fiber that is the main fiber constituting the separator, and the obtained separator tends to be inferior in mechanical strength. On the other hand, when the content of the binder exceeds 20% by mass based on the total mass of the separator, the difference between the surface roughness of the surface A and the surface roughness of the surface B of the obtained separator tends to be large, and a winding misalignment tends to occur when the separator is incorporated into the battery. When the content of the binder is within the above-described range, it is easy to adjust Ra (A)/Ra (B), which is the difference in surface roughness between the surface A and the surface B of the separator, so that it falls in the specific range in the present invention, which makes it possible to effectively suppress the occurrence of a winding misalignment when the separator is incorporated into the battery, whereby a separator having an excellent mechanical strength and good process passability can be obtained.

The alkaline battery separator of the present invention preferably has an air permeability of 50 cc/cm²/sec or less. The air permeability represents the denseness of the separator and is an index of the shielding properties. The air permeability can be controlled by adjusting the type and thickness of the alkali resistant fibers, the combination of the fibers and the blending ratio thereof, and the freeness of a beaten cellulose fiber when it is used. The separator having a low value of air permeability has excellent shielding properties, and can effectively prevent an internal short-circuit when incorporated in a battery. The air permeability of the alkaline battery separator of the present invention is more preferably 30 cc/cm²/sec or less, and particularly preferably 20 cc/cm²/sec or less. The lower limit of the air permeability is not particularly limited, but is usually 1 cc/cm²/sec or more, for example.

The air permeability is measured in accordance with the measurement method defined in JIS L 1096 6.27 "General Fabric Testing Method, Air Permeability".

The alkaline battery separator of the present invention preferably has a tensile strength in the vertical direction of 2 kg/15 mm or more, and more preferably 2.5 kg/15 mm or more. When the tensile strength is equal to or higher than the above-described lower limit, the separator has mechanical properties that can withstand the tension applied in the process of incorporating the separator into the battery, the process passability is improved, and sufficient impact resistance against impact such as dropping can be ensured. The upper limit of the tensile strength is not particularly limited, but is usually, for example, about 7 kg/15 mm. The tensile strength can be controlled by adjusting the type and thickness of the alkali resistant fibers, the combination of the fibers and the blending ratio thereof, the type and blending amount of the binder, the drying conditions of the wet paper after the papermaking, and the like.

The "vertical direction" means a flow direction when paper is manufactured, and also means a longitudinal direction when a separator is manufactured (direction parallel to the direction in which a separator is conveyed). The tensile strength can be measured by the method used in Examples, which are described below.

The weigh per unit area and the thickness of the alkaline battery separator of the present invention may be appropriately set according to the type of the battery in which the separator is incorporated. For example, the weigh per unit area (set value) is preferably 20 to 50 g/m², and more preferably 23 to 45 g/m². The thickness is preferably 70 to 150 μm, and more preferably 80 to 130 μm.

The alkaline battery separator of the present invention can be produced by a method that comprises, for example, a papermaking step of obtaining wet paper by a wet papermaking method, and a drying step of drying the wet paper using a contact dryer, wherein the drying step comprises applying a pressure in the thickness direction to wet paper having a water content of 65 to 75% by mass.

In the papermaking step in the method of the present invention for producing a separator, a conventionally known papermaking method can be used. Specifically, for example, wet paper can be obtained by beating an alkali resistant fiber that is the main fiber as required, then mixing it with a binder, and making paper using a general wet papermaking machine. Examples of the papermaking screen used in the papermaking machine include a cylinder screen, a short screen, and a long screen, and each of these papermaking screens may be used alone to form a single layer, or any of these papermaking screens may be used in combination for combined papermaking to form plural layers. It is preferred that the combined papermaking for plural layers are employed and, above all, it is preferred that a two-layer combination paper sheet is produced using a short screen-cylinder paper machine, from the point of obtaining a paper sheet that has no texture unevenness, that is homogeneous, and that is excellent in the electric properties. Further, from the viewpoint of improving the absorbent property for electrolyte solutions, a hydrophilic treatment such as a surfactant treatment may be performed.

In the present invention, from the viewpoint of improving the productivity of the separator, it is preferable that the thickness of the separator obtained after the papermaking (the thickness obtained before the adjustment of the thickness) is set to be thicker by about 5 μm than the ultimately desired thickness of the separator. Further, in a case where a hydrophilic treatment is applied after the papermaking, it is preferable that the thickness after the papermaking is slightly thicker than the final thickness that is intended to be set. For example, when the final thickness of the separator is 80 μm, the thickness after the papermaking is preferably 85 μm or more. When the thickness after the papermaking has the above-mentioned relationship with the final desired thickness of the separator, this makes it easy to control the thickness in the subsequent thickness adjustment, and also makes it easy to ensure the thickness required of the separator.

Next, the wet paper obtained through the papermaking step is dried using a contact dryer, and through this drying step, the alkaline battery separator of the present invention can be obtained. The drying step comprises applying a pressure, in the thickness direction, to wet paper having a water content of 65 to 75% by mass. The alkaline battery separator of the present invention is obtained by binding filaments of the alkali resistant fiber that is the main fiber by fusion with a binder that is at least partially dissolved or fused in the drying step. When the wet paper has a water content equal to or higher than the above-described lower limit in the drying step, the binder tends to exist in a dissolved or fused state in the wet paper. Therefore, when the wet paper is pressed against the contact dryer, filaments of the alkali resistant fiber are strongly bound to one another by the fusion of the binder, and a separator having an excellent mechanical strength can be obtained. Further, when the water content of the wet paper is equal to or lower than the above-described upper limit, it is not necessary to apply an excessive pressure to the wet paper to dry the water, and the difference in surface roughness between the surface A and the surface B of the obtained separator can be easily controlled. This makes it possible to obtain a separator that is unlikely to cause a winding misalignment when incorporated into a battery. In the present invention, the water content of the wet paper in the drying step is preferably 67% by mass or more, and preferably 73% by mass or less.

In the present invention, the above-described water content of the wet paper means the water content of the wet paper immediately before a pressure is applied to the wet paper. By applying a pressure to the wet paper having a specific water content in the thickness direction of the wet paper and pressing the wet paper against the surface of a drying roll of a contact dryer or the like, the binder which the wet paper comprises is dissolved/fused. Then, filaments of the alkali resistant fiber are bound to each other. At this time, the binder in the wet paper easily moves to the surface side of the drying roll of the contact dryer, resulting in that it is likely that the surface on the side in contact with the drying roll becomes a smooth surface (surface A), and the opposite surface becomes a relatively rough surface (surface B). The application of a pressure on the wet paper may be performed at any stage of the drying step, and may be performed only once during the drying step or may be performed a plurality of times during the drying step. It is preferable to apply a pressure in the thickness direction of the wet paper at the starting point where the wet paper comes into contact with the contact dryer, from the viewpoint that this allows for easy control of the water content of the wet paper and does not require a special device or a complicated control process. It is more preferable to apply a pressure only once during the drying step. When a pressure is applied to the wet paper a plurality of times during the drying step, the water content means the water content immediately before the first pressure application. Further, the water content can be measured, for example, by collecting wet paper immediately before pressure application, in accordance with the method used in Examples described later.

Controlling the water content of the wet paper in the drying step can be performed by, for example, the following methods: water in the wet paper obtained in the papermaking step is absorbed during conveyance to the dryer by a vacuum suction device provided along a route of conveyance until the water content of the wet paper reaches a desired level; the water in the wet paper is squeezed out with use of a press roll, or the like until the water content reaches a desired level; and the water content of the wet paper is controlled by controlling the water content of the felt that conveys the wet paper; or the water is sucked at a papermaking screen in the papermaking step.

The pressure applied to the wet paper may be appropriately determined according to the type and structure of the contact dryer used, the drying temperature and time, the speed at which the wet paper is conveyed, the thickness of the wet paper, the types of alkali resistant fiber and/or the binder that constitute the wet paper, and the contents thereof, the water content of the wet paper, and the like. For example, when a rotary cylinder type dryer such as a Yankee dryer described later is used, the touch pressure when the wet paper being conveyed is brought into contact with the rotating drying roll by the touch roll is preferably 0.5 kg/cm to 15 kg/cm, more preferably 1 kg/cm to 10 kg/cm, and further preferably 2 kg/cm to 6 kg/cm. By controlling the pressure applied to the wet paper within the above-described range, the difference in surface roughness between the surface A and the surface B can be caused to fall within the specific range. This makes it easy to obtain a high effect of suppressing a winding misalignment when the separator is incorporated into the battery, and as the binder constituting the separator is appropriately dissolved/fused to bond filaments of the alkali resistant fiber which is the main fiber to one another, a separator having an excellent mechanical strength and high shielding properties can be easily obtained.

The time for applying a pressure to the wet paper may be appropriately determined according to the type and structure of the contact dryer used, the pressure applied to the wet paper, the type of the binder constituting the wet paper and its content, and the like. For example, an appropriate difference in surface roughness can be given between the two surfaces by momentarily applying a pressure to the conveyed wet paper with a touch roll (for example, one second or less) to dry the water contained in the wet paper at once; at the same time, the binder is dissolved/fused into an appropriate film form, thereby imparting a sufficient strength to the obtained separator.

The drying temperature and the drying time in the drying step may be appropriately determined by the type and structure of the contact dryer used, the pressure applied to the wet paper, the speed at which the wet paper is conveyed, the type and content of the binder that constitutes the wet paper, the water content of the wet paper, and the like. For example, when a polyvinyl alcohol-based binder is used as the binder constituting the wet paper, the drying temperature is preferably 100° C. or higher, more preferably 120° C. or higher, further preferably 140° C. or higher, and preferably 170° C. or lower, more preferably 160° C. or lower, and further preferably 150° C. or lower. The drying time may be, for example, 10 to 120 seconds, and preferably 30 to 60 seconds. The drying time means a period of time while the wet paper is in contact with the contact dryer.

The contact dryer is not particularly limited, and it may be any dryer as long as it can dry the wet paper by bringing it into contact with wet paper and can apply a pressure in the thickness direction of the wet paper during the drying. A dryer conventionally known in the art can be used. Examples of the dryer include a Yankee dryer and a multi-cylinder type dryer. Among these, a Yankee dryer is preferable, from the viewpoint that, as being a single-cylinder dryer, it can easily adjust the surface roughnesses of the two surfaces of the separator to the desired ranges, and can easily apply a pressure only once in the thickness direction of the wet paper at the starting point where the wet paper comes into contact with the dryer.

Hereinafter, a production method of the present invention is described with reference to the FIGURE, which describes a typical embodiment of a method for producing an alkaline battery separator of the present invention.

In the papermaking step, the alkali resistant fiber and the binder to form the separator are mixed with water in a preparation tank 11 to obtain a slurry, and papermaking is performed by a papermaking machine 1 equipped with a papermaking screen 12 to obtain wet paper 3. The obtained wet paper 3 is conveyed from the papermaking screen 12 to a top felt 14 by a wet felt 13, and then conveyed to a contact dryer 2 by the top felt 14. The wet felt 13 may be provided with a vacuum suction device 15 for sucking excess water contained in the wet paper 3. The water of the wet felt 13 and the top felt 14 can be controlled by watering with use of a shower (not shown) or dewatering by suction (not shown). Further, when the wet paper 3 is conveyed from the wet felt 13 to the top felt 14, the water content of the wet paper 3 can be adjusted by the press roll 16. In the FIGURE, the contact dryer 2 includes a rotary drying roll 18 connected to a heat source heater or the like and set to a predetermined temperature, and the wet paper 3 conveyed by the top felt 14 is pressed against a surface of the drying roll 18 by a touch roll 17, whereby the binder contained in the wet paper 3 is dissolved/fused, thereby bonding filaments of the alkali resistant fiber to one another. At this time, the binder in the wet paper tends to move to the drying roll 18 side, and the surface on the side in contact with the drying roll 18 tends to be a smooth surface (surface A) while the surface on the opposite side tends to be a relatively rough surface (surface B). As described above, the surface roughnesses of the two surfaces of the separator can be adjusted to desired ranges, respectively, by controlling the touch pressure by the touch roll 17 and a period of time while a pressure is applied to the wet paper 3 by the touch roll 17, the temperature of the drying roll 18, the period of time while the wet paper 3 is in contact with the drying roll 18, and the like. By drying the wet paper 3 with the contact dryer 2, a dried product of the wet paper, that is, an alkaline battery separator 4 of the present invention can be obtained. The obtained alkaline battery separator 4 is wound by a winding roll 19.

The alkaline battery separator of the present invention can be suitably used in an alkaline battery.

An alkaline battery of the present invention can be produced by a general method known to those skilled in the art as long as it is provided with the above-mentioned alkaline battery separator of the present invention. Since the separator of the present invention has a high effect of suppressing a winding misalignment, it is suitable for an aspect incorporated in a spiral form in an alkaline battery (a spirally wound separator). Since the effect of suppressing a winding misalignment when the separator of the present invention is incorporated into the battery can be further improved, it is preferable that, when the separator of the present invention is incorporated into the battery, the separator is wound so that the surface B, which is relatively rough, is on an inner side, i.e., on the side of the mandrel that is used for insertion of the separator into the battery.

The alkaline battery separator of the present invention can effectively suppress a winding misalignment when the separator is incorporated into a battery, while satisfying various performances required of the separator; this makes it possible to reduce the amount of waste due to a winding misalignment, and contributes to the efficient and productive manufacture of alkaline batteries with excellent battery characteristics.

EXAMPLES

Hereinafter, the present invention will be described in more detail with reference to Examples, but the present invention is not limited to these Examples. Unless otherwise specified, "%" and "part" in Examples and Comparative Examples represent "% by mass" and "parts by mass", respectively.

Separators were prepared according to the compositions shown in Table 1, and physical properties and characteristics of each separator were analyzed according to the following method.

[Freeness (CSF) (ml)]

The Canadian Standard Freeness was measured in accordance with JIS P 8121 "Freeness Testing Method for Pulp".

[Water Content of Wet Paper]

Samples of wet paper immediately before being brought into contact with a dryer were collected, and water content of each sample was measured according to the following method.

About 10 g of each sample was placed in a weighing bottle whose mass was known, then the bottle was capped, and the weight (a) of the sample before drying was measured. The sample, in a state of being placed in the weighing bottle, was placed in a dryer adjusted to 105±2° C., and was dried for 3 hours, with the weighing bottle being uncapped. After drying, the weighing bottle was capped in the dryer, and was placed in a desiccator for 45 minutes so that the sample was cooled. After the cooling, the weight of each sample together with the weighing bottle was measured, and the weight (b) of the sample after drying was calculated from the difference between the measured weight and the weight of the weighing bottle. The water content of the wet paper was calculated by the following formula.

Wet paper water content (%)=(a−b)÷×100

[Weigh Per Unit Area (g/m$^2$)]

The weigh per unit area was measured in accordance with JIS P 8124 "Measurement Method of Meter Basis Weight for Paper Sheet".

[Thickness (mm), Density (g/cm$^3$)]

Measurement was performed in accordance with JIS P 8118 "Testing Method for Thickness and Density for Paper Sheet and Paper Board".

[Tensile Strength (kg/15 mm)]

Measurement was performed in accordance with JIS P 8113 "Tensile Strength Testing Method for Paper Sheet and Paper Board".

[Air Permeability (cc/cm$^2$/sec)]

Measurement was performed in accordance with JIS L 1096 6.27 "General Fabric Testing Method Air Permeability" using a Fragile-type testing machine.

[Arithmetic Mean Surface Roughness Ra]

A separator sample (50 mm×50 mm) for measuring a surface roughness was horizontally fixed to a fixation plate (about 15 cm×about 20 cm, a vinyl chloride plate having a thickness of about 3 mm). After a drive unit and a detector of a surface roughness measuring instrument ("SJ-410" manufactured by Mitutoyo Corporation) was set so that the vertical position was determined, 4 mm measurement was performed in the vertical direction (the direction in which the fibers are aligned). Regarding the two surfaces of the separator sample, measurement was performed at n=10, and respective arithmetic mean surface roughnesses (Ra) were calculated by the formula shown below.

Arithmetic Mean Surface Roughness (Ra): value obtained by summing absolute values of the deviation Yi from the mean line to the evaluation curve, and averaging it.

$$Ra = \frac{1}{n}\sum_{i=1}^{n}|Yi|$$

The arithmetic mean surface roughnesses obtained as to the two surfaces of the separator sample were compared, the surface with the smaller Ra value was defined as surface A (smooth surface: arithmetic mean surface roughness Ra (A)), and the surface with the larger Ra value was defined as surface B (rough surface: arithmetic mean surface roughness Ra (B)). The difference in surface roughness between the two surfaces of the separator (the difference in surface roughness between the front and back surfaces, or "front-back difference") was calculated according to the following formula.

Front-back difference=Ra(A)/Ra(B)

[Dissolved State of Binder]

Each separator sample (10 mm×10 mm) for measurement was immersed in a 0.1N iodine aqueous solution for 1 minute, and then it was placed on a slide glass, and photographed with a microscope (manufactured by Keyence Corporation). When the binder filaments were spread twice or more as compared with the fiber state before the separator was formed, it was determined that the binder filaments were dissolved/fused in a film form in the separator.

[Evaluation of Winding Misalignment]

Thirty 5 cm square separator samples were prepared, and the thirty sheets were stacked so that the rougher surface B of the two surfaces of the separator was on the lower side, whereby a sample for evaluation of a winding misalignment was obtained. The prepared sample for evaluation, a 15 cm square acrylic plate, and a 200 g weight were placed on a metal plate in this order. Evaluation was performed as follows: when the string is tied to the weight (200 g) and the string is pulled 30 cm in the direction horizontal to the metal plate at a speed of 35 cm/sec, if the evaluation samples do not collapse and remain in the stacked state, is determined as "○", and if the evaluation samples are displaced from each other and collapse, it is determined as "x".

[Preparation of Separator]

Example 1

50% by mass of a substance formed by treating organic solvent-spun cellulose fibers of 1.7 dtex×3 mm ("Tencel" produced by Lenzing AG) using a refiner to be adjusted to have the freeness, in terms of CSF, of 250 ml, 35% by mass of a 0.3 dtex×3 mm polyvinyl alcohol-based fiber (vinylon, VN30300, produced by Kuraray Co., Ltd.), and 15% by mass of a 1.1 dtex×3 mm polyvinyl alcohol-based binder fiber (vinylon binder: VPB107-1×3 produced by Kuraray Co., Ltd.) were dispersed in water to produce slurry, and two-layer papermaking was performed by a papermaking machine, whereby wet paper was obtained. After the water content of the obtained wet paper was adjusted to 71% by mass by using a vacuum suction device and a press roll, the wet paper was dried for seconds at a drying temperature of 132° C. using a Yankee dryer. At this time, at the starting point where the wet paper was brought into contact with the Yankee dryer, a touch pressure of 3 kg/cm was applied to the wet paper with a touch roll. Next, the thickness was adjusted between an elastic roll and a metal roll to obtain an alkaline battery separator having a weigh per unit area of 24.7 g/m² and a thickness of 82 μm.

Comparative Example 1

Papermaking was performed using the same composition and method as those in Example 1, and the water content of the obtained wet paper was adjusted to 71% by mass, and then the paper was wound up in the wet paper state. Then, using a 4-cylinder type multi-cylinder dryer, the wet paper was dried at a drying temperature of 135° C. for 1 minute without application of a pressure in the thickness direction. Then, the thickness was adjusted between an elastic roll and a metal roll to obtain an alkaline battery separator having a weigh per unit area of 25.1 g/m² and a thickness of 83 μm.

Example 2

Papermaking was performed to obtain wet paper in the same manner as that of Example 1 except that the content of the 0.3 dtex×3 mm polyvinyl alcohol-based fiber (vinylon, VN30300, produced by Kuraray Co., Ltd.) was changed to 40% by mass, and the content of the 1.1 dtex×3 mm polyvinyl alcohol-based binder fiber (vinylon binder: VPB107-1×3, produced by Kuraray Co., Ltd.) was changed to 10% by mass. After the water content of the wet paper was adjusted to 69% by mass, the wet paper was dried for 40 seconds at a drying temperature of 131° C. using a Yankee dryer. At this time, at the starting point where the wet paper was brought into contact with the Yankee dryer, a touch pressure of 3 kg/cm was applied to the wet paper by a touch roll. Next, the thickness was adjusted between an elastic roll and a metal roll to obtain an alkaline battery separator having a weigh per unit area of 25.2 g/m² and a thickness of 83 μm.

Example 3

Papermaking was performed to obtain wet paper in the same manner as that of Example 1 except that the content of the 0.3 dtex×3 mm polyvinyl alcohol-based fiber (vinylon, VN30300, produced by Kuraray Co., Ltd.) was changed to 30% by mass, and the content of the 1.1 dtex×3 mm polyvinyl alcohol-based binder fiber (vinylon binder: VPB107-1×3, produced by Kuraray Co., Ltd.) was changed to 20% by mass. After the water content of the wet paper was adjusted to 70% by mass, the wet paper was dried for 40 seconds at a drying temperature of 132° C. using a Yankee dryer. At this time, at the starting point where the wet paper was brought into contact with the Yankee dryer, a touch pressure of 3 kg/cm was applied to the wet paper by a touch roll. Next, the thickness was adjusted between an elastic roll and a metal roll to obtain an alkaline battery separator having a weigh per unit area of 24.9 g/m² and a thickness of 82 μm.

Comparative Example 2

Papermaking was performed to obtain wet paper in the same manner as that of Example 1 except that the content of the 0.3 dtex×3 mm polyvinyl alcohol-based fiber (vinylon, VN30300, produced by Kuraray Co., Ltd.) was changed to 25% by mass, and the content of the 1.1 dtex×3 mm polyvinyl alcohol-based binder fiber (vinylon binder: VPB107-1×3, produced by Kuraray Co., Ltd.) was changed to 25% by mass. After the water content of the wet paper was adjusted to 72% by mass, the wet paper was dried for 40 seconds at a drying temperature of 132° C. using a Yankee dryer. At this time, at the starting point where the wet paper was brought into contact with the Yankee dryer, a touch pressure of 3 kg/cm was applied to the wet paper by a touch roll. Next, the thickness was adjusted between an elastic roll and a metal roll to obtain an alkaline battery separator having a weigh per unit area of 24.4 g/m² and a thickness of 84

Comparative Example 3

Papermaking was performed to obtain wet paper in the same manner as that of Example 1 except that the content of the 0.3 dtex×3 mm polyvinyl alcohol-based fiber (vinylon, VN30300, produced by Kuraray Co., Ltd.) was changed to 48% by mass, and the content of the 1.1 dtex×3 mm polyvinyl alcohol-based binder fiber (vinylon binder: VPB107-1×3, produced by Kuraray Co., Ltd.) was changed to 2% by mass. After the water content of the wet paper was adjusted to 70% by mass, the wet paper was dried for 40 seconds at a drying temperature of 131° C. using a Yankee dryer. At this time, at the starting point where the wet paper was brought into contact with the Yankee dryer, a touch pressure of 3 kg/cm was applied to the wet paper by a touch roll. Next, the thickness was adjusted between an elastic roll and a metal roll to obtain an alkaline battery separator having a weigh per unit area of 25.5 g/m² and a thickness of 82 μm.

Comparative Example 4

Papermaking was performed to obtain wet paper in the same manner as that of Example 1 except that the materials used were changed to 40% by mass of 1.1 dtex×3 mm polyvinyl alcohol-based fiber (vinylon, VPB103×3, produced by Kuraray Co., Ltd.), 45% by mass of 1.6 dtex×3 mm rayon fiber (CORONA, produced by Daiwabo Co., Ltd.), and 15% by mass of 1.1 dtex×3 mm polyvinyl alcohol-based binder fiber (vinylon binder: VPB107-1×3, produced by Kuraray Co., Ltd.). After the water content of the wet paper was adjusted to 68% by mass, the wet paper was dried for 40 seconds at a drying temperature of 130° C. using a Yankee dryer. At this time, at the starting point where the wet paper was brought into contact with the Yankee dryer, a touch pressure of 3 kg/cm was applied to the wet paper by a touch roll. Next, the thickness was adjusted between an elastic roll and a metal roll to obtain an alkaline battery separator having a weigh per unit area of 26.1 g/m² and a thickness of 82 μm.

Comparative Example 5

Papermaking was carried out using the same composition and method as those in Example 2 to obtain wet paper. An alkaline battery separator having a weigh per unit area of 24.7 g/m² and a thickness of 84 μm was obtained by the same method as that in Example 2 except that the water content of the obtained wet paper was changed to 58% by mass.

Comparative Example 6

Papermaking was carried out using the same composition and method as in those in Example 1 to obtain wet paper. An alkaline battery separator having a weigh per unit area of 25.2 g/m² and a thickness of 82 μm was obtained by the same method as that in Example 1 except that the water content of the obtained wet paper was changed to 77% by mass and the touch pressure applied by the touch roll was changed to 1 kg/cm.

Comparative Example 7

Papermaking was performed to obtain wet paper in the same manner as that of Example 1 except that the content of 0.3 dtex×3 mm polyvinyl alcohol-based fiber (vinylon, VN30300, produced by Kuraray Co., Ltd.) was changed to 15% by mass, and the content of the 1.1 dtex×3 mm polyvinyl alcohol-based binder fiber (vinylon binder: VPB107-1×3, produced by Kuraray Co., Ltd.) was changed to 35% by mass. After the water content of the wet paper was adjusted to 72% by mass, the wet paper was dried for 40 seconds at a drying temperature of 132° C. using a Yankee dryer. At this time, at the starting point where the wet paper was brought into contact with the Yankee dryer, a touch pressure of 3 kg/cm was applied to the wet paper by a touch roll. Furthermore, after the water content of the wet paper was adjusted to 60% by mass by transferring water from a blanket using an unwinding device, the wet paper was dried for 40 seconds at a drying temperature of 132° C. using a Yankee dryer in such a manner that the surface opposite to the surface having been brought into contact with a dryer first comes into contact with the dryer. At this time, a touch pressure of 1 kg/cm was applied to the wet paper. Next, the thickness was adjusted between an elastic roll and a metal roll to obtain an alkaline battery separator having a weigh per unit area of 24.3 g/m² and a thickness of 72 μm.

TABLE 1

| | | | Example 1 | Comparative Example 1 | Example 2 | Example 3 | Comparative Example 2 |
|---|---|---|---|---|---|---|---|
| Alkali resistant fiber | Vinylon (0.3 dtex × 3 mm) | % by mass | 35 | 35 | 40 | 30 | 25 |
| | Vinylon (1.1 dtex × 3 mm) | % by mass | | | | | |
| | Rayon (1.6 dtex × 3 mm) | % by mass | | | | | |
| | Tencel (beating degree 250 ml) | % by mass | 50 | 50 | 50 | 50 | 50 |
| Binder | Vinylon binder (1.1 dtex × 3 mm) | % by mass | 15 | 15 | 10 | 20 | 25 |
| Drying conditions | Dryer | | Yankee | Multi-cylinder type | Yankee | Yankee | Yankee |
| | Drying Temperature | ° C. | 132 | 135 | 131 | 132 | 132 |
| | Touch pressure when drying | kg/cm | 3 | — | 3 | 3 | 3 |
| | Water content of wet paper | % by mass | 71 | 71 | 69 | 70 | 72 |
| Physical properties/ characteristics of separator | Binder dissolution state | | ○: Membrane | x: Fibrous | ○: Membrane | ○: Membrane | ○: Membrane |
| | Weigh per unit area | g/m² | 24.7 | 25.1 | 25.2 | 24.9 | 24.4 |
| | Thickness | mm | 82 | 83 | 83 | 82 | 84 |
| | Tensile strength (verticle direction) | kg/15 mm | 3.5 | 1.2 | 2.6 | 4.1 | 4.2 |
| | Air permeability | cc/cm²/sec | 14 | 18 | 16 | 14 | 12 |
| | Arithmetic mean surface roughness Ra (A) | μm | 6.846 | 8.198 | 7.625 | 6.173 | 5.214 |
| | Arithmetic mean surface roughness Ra (B) | μm | 8.064 | 8.287 | 8.129 | 7.826 | 7.765 |
| | Front and back difference (Ra (A)/Ra (B)) | | 0.849 | 0.989 | 0.938 | 0.789 | 0.671 |
| | Evaluation of winding misalignment | | ○ | ○ | ○ | ○ | x |

| | | | Comparative Example 3 | Comparative Example 4 | Comparative Example 5 | Comparative Example 6 | Comparative Example 7 |
|---|---|---|---|---|---|---|---|
| Alkali resistant fiber | Vinylon (0.3 dtex × 3 mm) | % by mass | 48 | | 40 | 35 | 15 |
| | Vinylon (1.1 dtex × 3 mm) | % by mass | | 40 | | | |
| | Rayon (1.6 dtex × 3 mm) | % by mass | | 45 | | | |
| | Tencel (beating degree 250 ml) | % by mass | 50 | | 50 | 50 | 50 |
| Binder | Vinylon binder (1.1 dtex × 3 mm) | % by mass | 2 | 15 | 10 | 15 | 35 |
| Drying conditions | Dryer | | Yankee | Yankee | Yankee | Yankee | Yankee × 2 |
| | Drying Temperature | ° C. | 131 | 130 | 130 | 132 | 132-132 |
| | Touch pressure when drying | kg/cm | 3 | 3 | 3 | 1 | 3-1 |
| | Water content of wet paper | % by mass | 70 | 68 | 58 | 77 | 72-60 |
| Physical properties/ characteristics of separator | Binder dissolution state | | ○: Membrane | ○: Membrane | x: Fibrous | ○: Membrane | ○: Membrane |
| | Weigh per unit area | g/m² | 25.5 | 26.1 | 24.7 | 25.2 | 24.3 |
| | Thickness | mm | 82 | 82 | 84 | 82 | 72 |
| | Tensile strength (verticle direction) | kg/15 mm | 0.9 | 3.1 | 1.6 | 3.4 | 3.2 |

TABLE 1-continued

| | | | | | | |
|---|---|---|---|---|---|---|
| Air permeability | cc/cm²/sec | 18 | 65 | 17 | 12 | 6 |
| Arithmetic mean surface roughness Ra (A) | μm | 8.147 | 8.798 | 8.092 | 5.239 | 2.474 |
| Arithmetic mean surface roughness Ra (B) | μm | 8.379 | 11.786 | 8.227 | 8.124 | 2.879 |
| Front and back difference (Ra (A)/Ra (B)) | | 0.972 | 0.746 | 0.984 | 0.645 | 0.859 |
| Evaluation of winding misalignment | | ○ | ○ | ○ | x | x |

As shown in Table 1, it was confirmed that, in the case of an alkaline battery separator of the present invention wherein the content of the binder based on the total mass of the separator was 5 to 20% by mass, the value of Ra (A)/Ra (B) indicating the difference in surface roughness between the surface A and the surface B was 0.700 or more and 0.980 or less, and Ra (B) was 3.0 μm or more and 10 μm or less, the occurrence of a winding misalignment when the separator was incorporated into a battery was suppressed, and the separator had excellent shielding properties and a mechanical strength that were requested for the separator (Examples 1 to 3).

DESCRIPTION OF REFERENCE SIGNS

1: Papermaking machine
2: Contact dryer
3: Wet paper
4: Dried product obtained by drying wet paper (alkaline battery separator)
11: Preparation tank
12: Papermaking screen
13: Wet felt
14: Top felt
15: Vacuum suction device
16: Press roll
17: Touch roll
18: Drying roll
19: Winding roll

The invention claimed is:

1. An alkaline battery separator, comprising:
an alkali resistant fiber and
a binder,
wherein the alkaline battery separator has two surfaces: a surface A and a surface B,
the surface A is smoother comparing with the surface B and has an arithmetic mean surface roughness Ra (A),
the surface B is rougher and has an arithmetic mean surface roughness Ra (B),
the alkaline battery separator comprises the binder in an amount of from 5 to 20% by mass based on a total mass of the alkaline battery separator,
a value obtained by dividing the arithmetic mean surface roughness Ra (A) by the arithmetic mean surface roughness Ra (B) [Ra (A)/Ra (B)] is from 0.700 to 0.980, and
the arithmetic mean surface roughness Ra (B) of the surface B is from 3.0 μm to 10 μm.

2. The alkaline battery separator according to claim 1, wherein the binder is a polyvinyl alcohol-based binder.

3. The alkaline battery separator according to claim 1, wherein at least a part of the alkali resistant fiber is a polyvinyl alcohol-based fiber.

4. The alkaline battery separator according to claim 1, wherein at least a part of the alkali resistant fiber is a cellulose fiber.

5. The alkaline battery separator according to claim 1, having an air permeability of 50 cc/cm2/sec or less.

6. The alkaline battery separator according to claim 1, having a tensile strength in a vertical direction of 2 kg/15 mm or more.

7. A method of producing the alkaline battery separator according to claim 1, the method comprising:
obtaining wet paper by a wet papermaking method; and drying the wet paper using a contact dryer,
wherein the drying comprises applying a pressure, in a thickness direction, to the wet paper having a water content of from 65 to 75% by mass.

8. An alkaline battery, comprising the alkaline battery separator according to claim 1.

* * * * *